(12) United States Patent
Evans et al.

(10) Patent No.: US 6,321,166 B1
(45) Date of Patent: Nov. 20, 2001

(54) NOISE REDUCTION DIFFERENTIAL PRESSURE MEASUREMENT PROBE

(76) Inventors: Russell N. Evans, 436 E. Fir Ct., Louisville, CO (US) 80027; Terry X. Beachey, 2214 Spinnaker Cir., Longmont, CO (US) 80503

( * ) Notice: Subject to any disclaimer, the term of this patent is extended or adjusted under 35 U.S.C. 154(b) by 0 days.

(21) Appl. No.: 09/368,801

(22) Filed: Aug. 5, 1999

(51) Int. Cl.[7] ................................................. G01F 1/46
(52) U.S. Cl. ................................... 702/50; 73/861.65
(58) Field of Search ..................... 702/50; 73/861.65, 73/861.66

(56) References Cited

U.S. PATENT DOCUMENTS

| | | | |
|---|---|---|---|
| 4,154,100 | * | 5/1979 | Harbaugh et al. ................ 73/212 |
| 4,735,100 | * | 4/1988 | Hajto ............................... 73/861.66 |
| 5,036,711 | * | 8/1991 | Good ............................... 73/861.66 |
| 5,123,288 | * | 6/1992 | Tench et al. ..................... 73/861.66 |
| 5,152,181 | * | 10/1992 | Lew ................................. 73/861.02 |
| 5,365,795 | * | 11/1994 | Brower, Jr. ...................... 73/861.65 |
| 5,535,634 | * | 7/1996 | Traina et al. .................... 73/861.65 |
| 5,710,370 | * | 1/1998 | Shanahan et al. ................ 73/1.35 |
| 5,773,726 | * | 6/1998 | Mahoney et al. ................ 73/861.65 |
| 5,817,950 | * | 10/1998 | Wiklund et al. ................. 73/861.66 |
| 5,969,266 | * | 10/1999 | Mahoney et al. ................ 73/861.65 |

* cited by examiner

*Primary Examiner*—Patrick Assouad
(74) *Attorney, Agent, or Firm*—Richard W. Hanes

(57) ABSTRACT

A differential pressure measuring probe with an improved signal to noise ratio is provided. The probe includes an slit surface with at least one longitudinally extending impact aperture communicating with a first plenum within the body of the probe. The width of the aperture is selected to be less than the width of the interior portion of a first plenum. A non-impact surface is provided with non-impact apertures to measure a second pressure such that differential pressure between the impact surface and the non-impact surface can be measured.

19 Claims, 9 Drawing Sheets

US 6,321,166 B1

NOISE REDUCTION DIFFERENTIAL PRESSURE MEASUREMENT PROBE

BACKGROUND OF THE INVENTION

The process industry employs process variable transmitters to monitor process variables associated with substances such as solids, slurries, liquids, vapors, and gases in chemical, pulp, petroleum, pharmaceutical, food and other processing plants. Process variables include pressure, temperature, flow, level, turbidity, density, concentration, chemical composition and other properties. A process fluid flow transmitter provides an output related to a sensed process fluid flow. The flow transmitter output can be communicated over a process control loop to a control room, or the output can be communicated to another process device such that the process can be monitored and controlled.

Measuring the rate of fluid flow in a confined conduit by modifying the internal geometry of the conduit and applying an algorithm to the measured differential pressure in the flowing fluid, is known. The geometry of the conduit is traditionally changed by altering the cross section of the conduit, such as with a venturi meter, or by the insertion into the conduit of a flow altering device such as a orifice plate, or an averaging pitot tube or the like.

An averaging pitot tube generally includes a shaped bluff body that slightly impedes fluid flow within the conduit. One limitation of some averaging pitot tubes is a relatively lower signal to noise ratio in the differential pressure data being sensed. "Noise" in the context of a differential pressure measuring device, such as a flow transmitter, is the instantaneous deviation from an average pressure reading from one data point to another. The noise generated in a pitot tube type of differential pressure sensor originates in the impact pressure sensors on the upstream facing side of the pitot tube and in the non-impact pressure ports generally on the downstream side of the pitot tube.

As differential pressure transmitters and data acquisition systems have become more sophisticated and responsive, they have also become more sensitive to and are increasingly influenced by the noise generated by the pressure sensing unit. Accordingly, the noise characteristics of differential pressure sensing devices, have become a more important factor in their selection and operation. Thus, there is a need to provide an improved differential pressure sensing device having an improved signal to noise ratio.

SUMMARY OF THE INVENTION

A differential pressure measuring probe with an improved signal to noise ratio is provided. The probe includes an impact surface with at least one elongated impact aperture having a width and a longitudinal component. The width of the impact aperture is selected to be less than the width of an interior portion of a first plenum within the probe. A non-impact surface is provided with at least one non-impact aperture to measure a second pressure such that differential pressure between the impact surface and the non-impact surface can be measured.

DETAILED DESCRIPTION

Although the invention will be described with reference to specific embodiments of differential pressure measuring probes, workers skilled in the art will recognize that changes can be made in form and detail without departing from the spirit and scope of the invention, which are defined by the appended claims.

Figure 1:
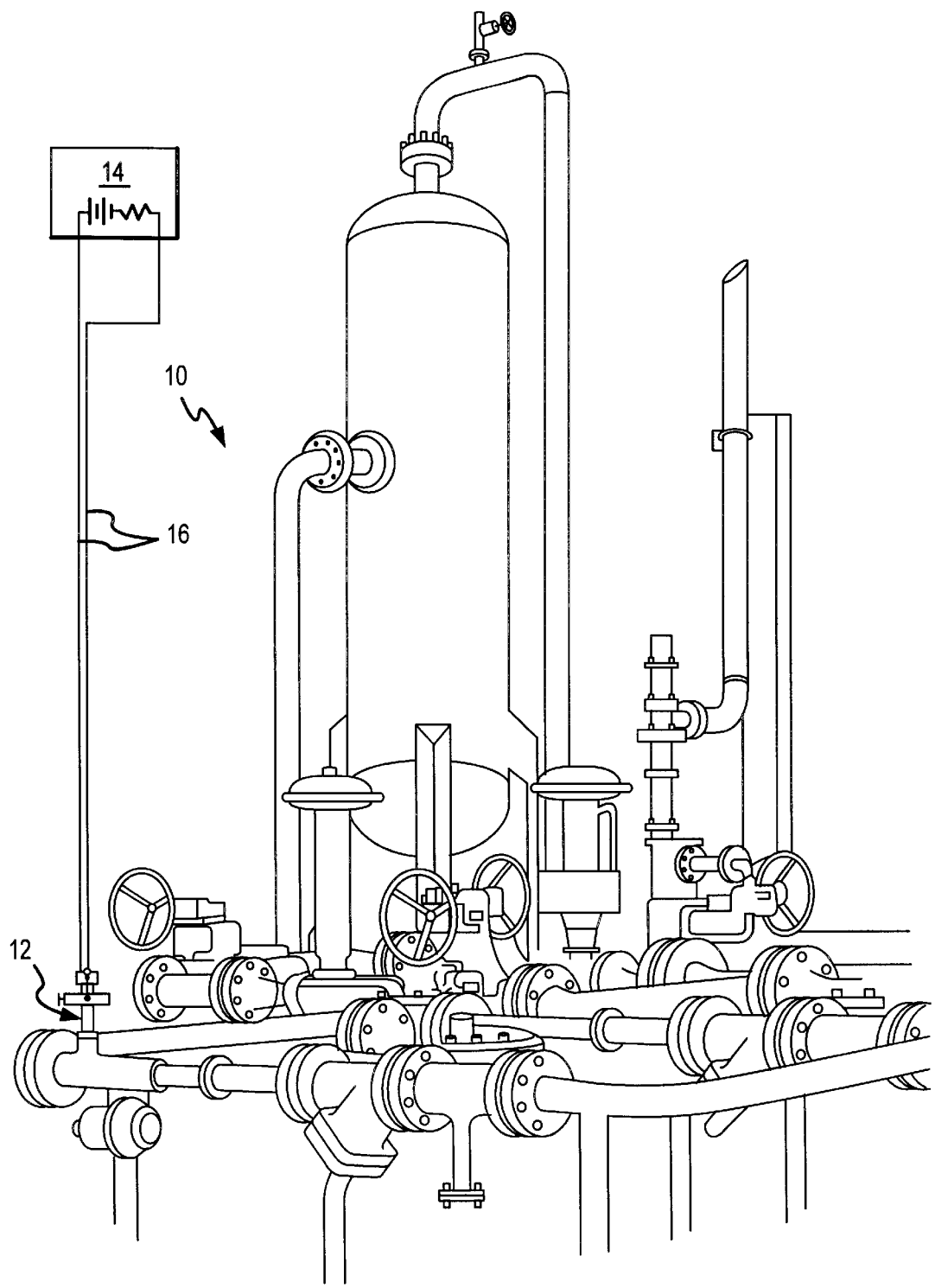
FIGS. 1 and 2 are diagrammatic views of a process measurement system illustrating the environment of embodiments of the invention.

FIG. 1 is a diagrammatic view of process control system 10 illustrating one example of an environment of embodiments of the invention. Pressure measurement system 12 is coupled to control room 14 (modelled as a voltage source and resistance) through process control loop 16. Loop 16 can utilize any appropriate protocol to communicate flow information between measurement system 12 and control room 14. For example, process control loop 16 operates in accordance with a process industry standard protocol such as Highway Addressable Remote Transducer (HART®), FOUNDATION™ Fieldbus or any other appropriate protocol.

Figure 2:
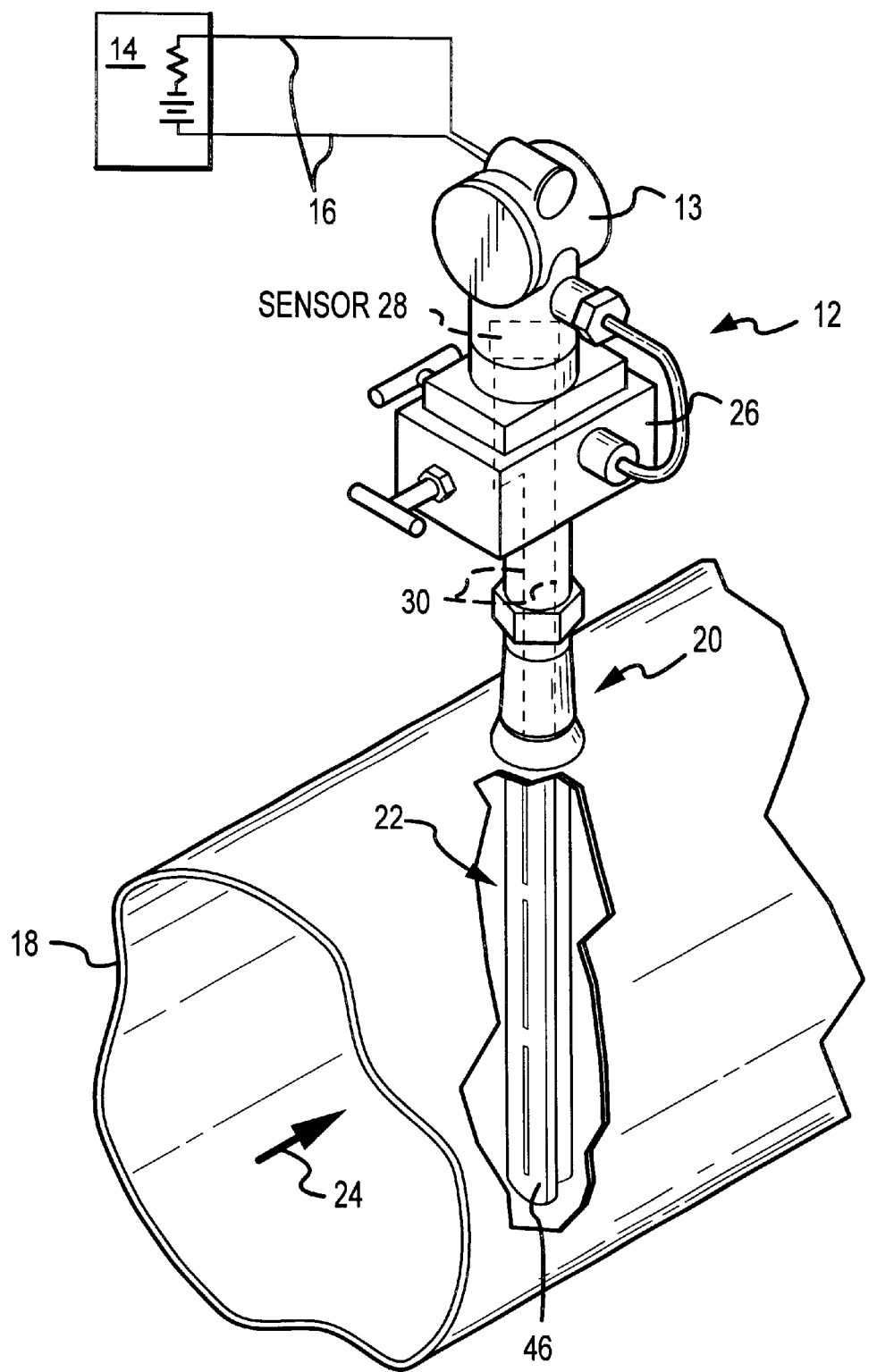

FIG. 2 shows a cut away portion of a process fluid container such as a pipe, or closed conduit, 18 into which is installed a differential pressure measuring probe 20 of the averaging pitot tube type. Bluff body 22 diametrically spans the inside of pipe 18. The directional arrow 24 in FIG. 2 indicates the direction of fluid flow in pipe 18. A fluid manifold 26 and flow transmitter 13 are shown mounted on the exterior end of pitot tube 20. Transmitter 13 includes a pressure sensor 28 that is fluidically coupled to probe 20 through passageways 30 (shown in phantom in FIG. 2).

Figure 3:
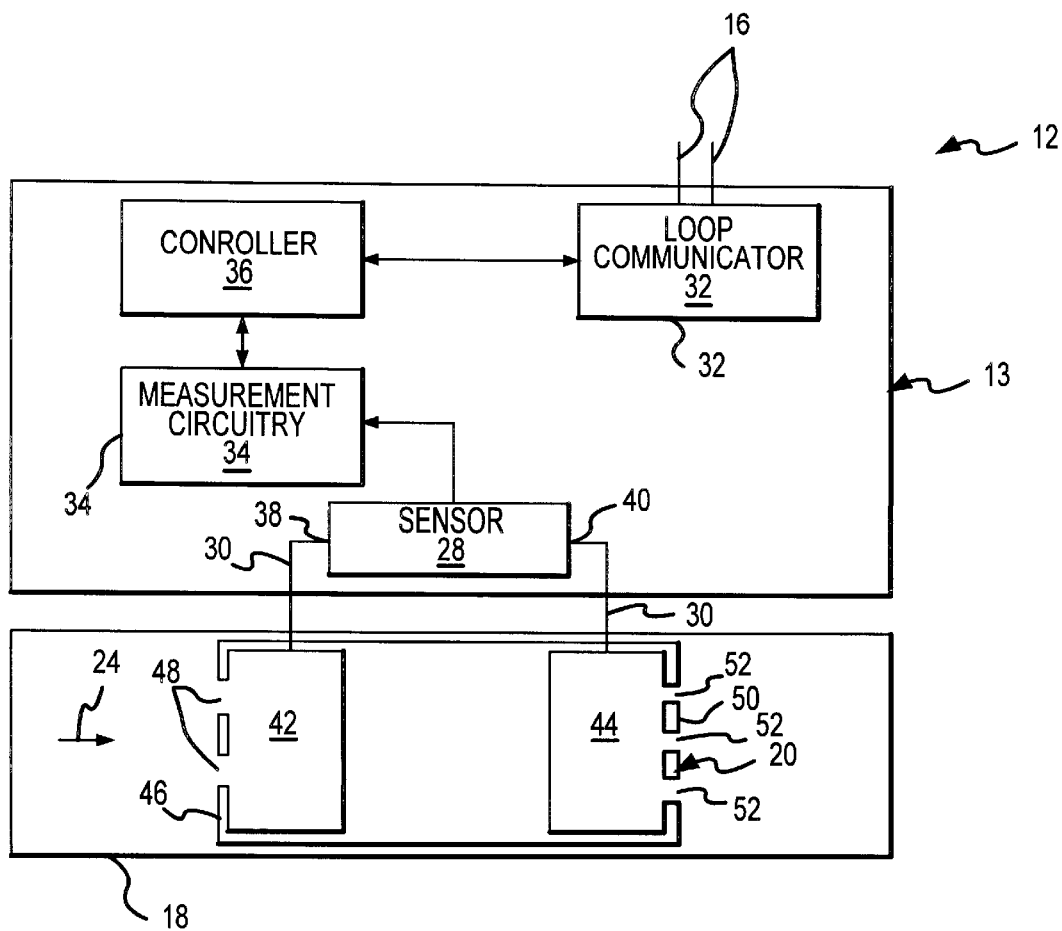
FIG. 3 is a system block diagram of process measurement system 12.

FIG. 3 is a system block diagram of differential pressure measurement system 12. System 12 includes flow transmitter 13 and differential pressure measurement probe 20. In some embodiments, flow transmitter 13 and probe 20 can be factory matched to provide enhanced accuracy, longevity and diagnostics for a particular differential flow measurement application. System 12 is coupleable to a process control loop such as loop 16 and is adapted to communicate a process variable output related to a differential pressure of fluid flow within pipe 18. Transmitter 13 of system 12 includes a loop communicator 32, pressure sensor 28, measurement circuitry 34, and controller 36.

Loop communicator 32 is coupleable to a process control loop, such as loop 16, and is adapted to communicate upon the process control loop. Such communication can be in accordance with any appropriate process industry standard protocol such as the protocols discussed above.

Pressure sensor 28 includes first and second ports 38, 40 which are coupled to first and second plenums 42, 44 respectively through passageways 30. Sensor 28 can be any device that has an electrical characteristic that changes in response to changes in applied pressure. For example, sensor 28 can be a capacitive pressure sensor the capacitance of which changes in response to the differential pressure applied between ports 38, and 40. If desired, sensor 28 can include a pair of pressure sensitive elements such that each plenum is coupled to its own pressure sensitive element.

Measurement circuitry 34 is coupled to sensor 28 and is configured to provide a sensor output related at least to differential pressure between ports 38 and 40. Measurement circuitry 34 can be any electronic circuitry that can provide a suitable signal related to differential pressure. For example, measurement circuitry can be an analog-to-digital converter, a capacitance-to-digital converter or any other appropriate circuitry.

Controller 36 is coupled to measurement circuitry 34 and loop communicator 32. Controller 36 is adapted to provide a process variable output to loop communicator 32, which output is related to the sensor output provided by measurement circuitry 34. Controller 36 can be a Programmable Gate Array device, microprocessor, or any other appropriate device.

Although loop communicator 32, measurement circuitry 34 and controller 36 have been described with respect to individual modules, it is contemplated that they can be combined such as on an Application Specific Integrated Circuit (ASIC).

Differential pressure measurement probe 20 is coupled to transmitter 13 by passageways 30. Thus, port 38 of sensor 28 is coupled to first plenum 42, while port 40 of sensor 28 is coupled to second plenum 44. A "plenum" is a passageway, a channel, a tube or the like into which fluid of a particular character or pressure is directed or admitted and through which the fluid is conducted or conveyed.

First plenum 42 includes at least one elongated impact aperture 48 and is disposed to communicate pressure from the probes impact surface 46 to port 38 of sensor 28. Aperture 48 includes a longitudinal component that, in some embodiments, can be long enough that aperture 48 will be substantially aligned with the longitudinal axis of bluff body 22. As can be seen from FIGS. 2 and 4–8, the at least one impact aperture 48 can take the form of a slit having a width and a longitudinal component greater than the width. Such slit provides enhanced noise reduction in the total pressure signal, and thus increases the signal to noise ratio of the measurement system. It is important for the width of the slit to be less than an interior width of the plenum to which it is connected. Slit widths ranging from about 0.76 millimeters (0.030 inches) to about 6.35 millimeters (0.250 inches) provide suitable results. Additionally, a plurality of slits can be used that can be spaced from one another laterally, or longitudinally.

Second plenum 44 includes a non-impact surface 50 spaced from impact surface 46. Non-impact surface 50 includes at least one non-impact aperture 52 disposed to communicate pressure from the non-impact surface via plenum 44 to port 40 of sensor 28. The at least one non-impact aperture 52 can be elongated and configured to have a longitudinal component similar to the impact aperture 48, or aperture 52 can be shaped conventionally as a circular hole. If a second plenum is not needed, a pressure tap can be provided, such as in the wall of pipe 18, such that non-impact aperture 52 is disposed within pipe 18 to communicate a non-impact pressure to port 40. For example, aperture 52 can be disposed proximate the inside wall of pipe 18.

Figure 4:
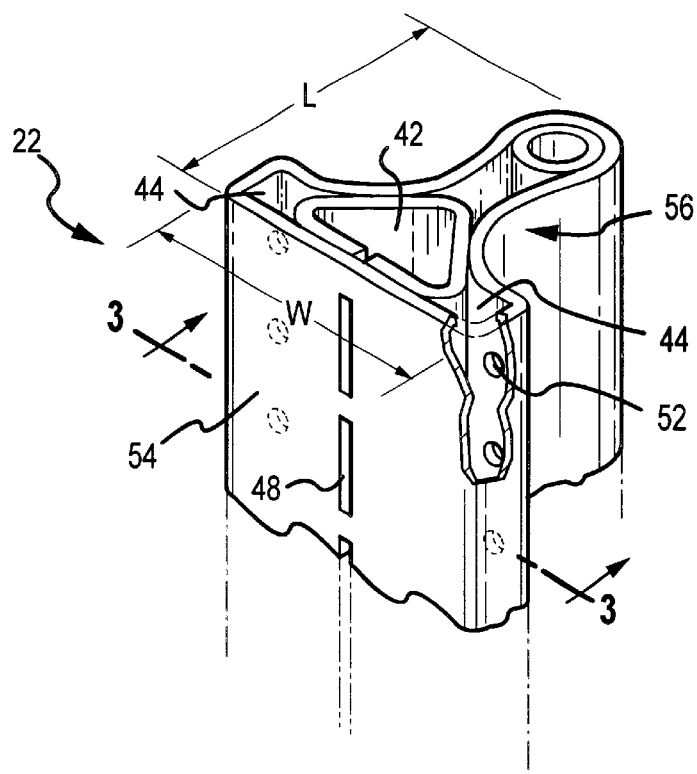
FIG. 4 is a fragmentary perspective view of a "T" shaped form bluff body illustrating impact apertures of an embodiment of the invention.
Figure 5:
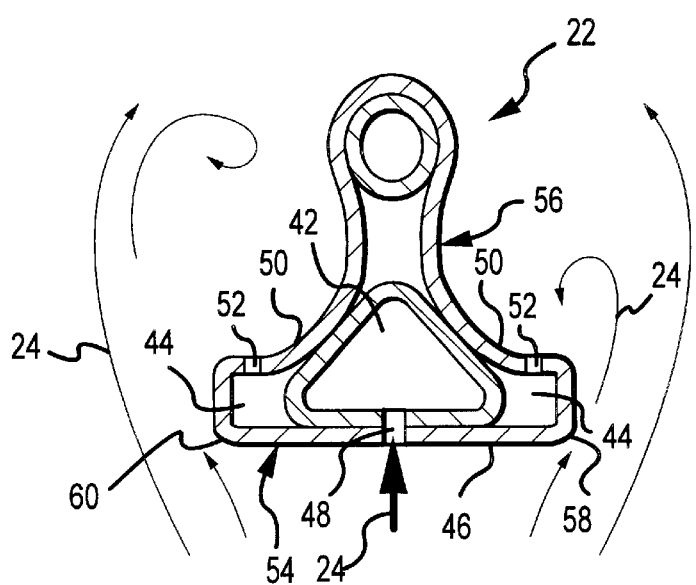
FIG. 5 is a cross sectional view taking along lines 3—3 of FIG. 4. The curved arrows show the general direction of fluid flow around the body.

FIGS. 4 and 5 respectively show fragmentary perspective and cross sectional views of the bluff body portion 22 of the pitot tube 20. As illustrated, a cross section of bluff body 22 resembles the letter "T", including a bar portion 54 having a blunt, substantially flat impact surface 46 on the "top" of the letter "T". The cross section of the body also illustrates the stem portion 56 of letter "T," depending from the center of the bar 54 and disposed generally perpendicularly thereto. In the perspective view of the bluff body (FIG. 4) the so-called "stem" of the "T" is seen to be a longitudinally extending rib 56 that projects in a downstream direction from the back side of the flat faced bar 54. While the use of the "T" shaped bluff body in conjunction with longitudinal impact slits provides favorable results, using such impact slits with other bluff body shapes provides similar advantages. Thus, the slit construction will also produce noise reduction advantages and pressure integration in a bluff body having the traditional shapes of diamond, circular, flare, etc., as illustrated in FIGS. 9a–9f.

In the various embodiments of the invention, conventional impact apertures in the impact surface are replaced with one or more elongated impact apertures having a longitudinal component. The elongated impact apertures, or slits 48, provide communication between the total pressure (impact) fluid in conduit 18 and plenum 42. The impact pressure of the flowing fluid is conducted from the plenum 42 to port 38 of pressure sensor 28 within flow transmitter 13. As opposed to a plurality of spaced apart circular apertures, the slit configuration provides a reduction in the noise associated with the measurement of the high fluid pressure, provided that the slit serves as the entry to a wider plenum. In order to achieve the noise reduction, the slit should not act as the plenum itself. For example, if the slit in the bar face is 0.8 millimeters (0.031 inches) wide and the high pressure fluid conducting plenum is 3.2 millimeters (0.125) inches wide, a satisfactory ratio would exist. These dimensions and the ratio are exemplary only and should not be taken as restrictive or limiting.

While one embodiment of the invention utilizes a plurality of longitudinally aligned and longitudinally oriented (with respect to the diametric spanning length of the bluff body) impact slits that are laterally centrally disposed on the impact face of the bluff body (FIG. 2), other configurations are also contemplated. For example, one slit, running substantially the entire length of the bluff body is effective to accomplish high pressure noise reduction. A plurality of non-aligned slit openings that are longitudinally oriented would also provide noise reduction. A plurality of parallel slit openings that are longitudinally oriented will also provide noise reduction. Further, the slits can be positioned on the impact surface to provide an average indication of a specific type of fluid flow profile, such as laminar and turbulent flow. Further still, slit length can be varied based upon slit position on the impact surface such that impact pressure sampled from a specific aperture can be weighted based upon position. However, longitudinal orientation of the slit openings, that is orientation that is diametric, or close to diametric, with respect to the fluid carrying conduit, is important if the integrating function of the slits is to be maintained.

Figure 6:
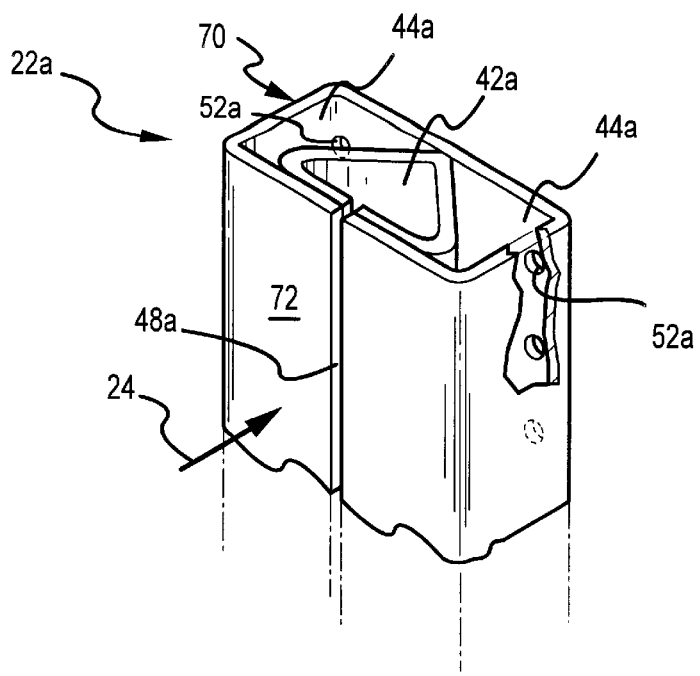
FIG. 6 is a fragmentary perspective of another embodiment showing a form of the flat-face bluff body.
Figure 7:
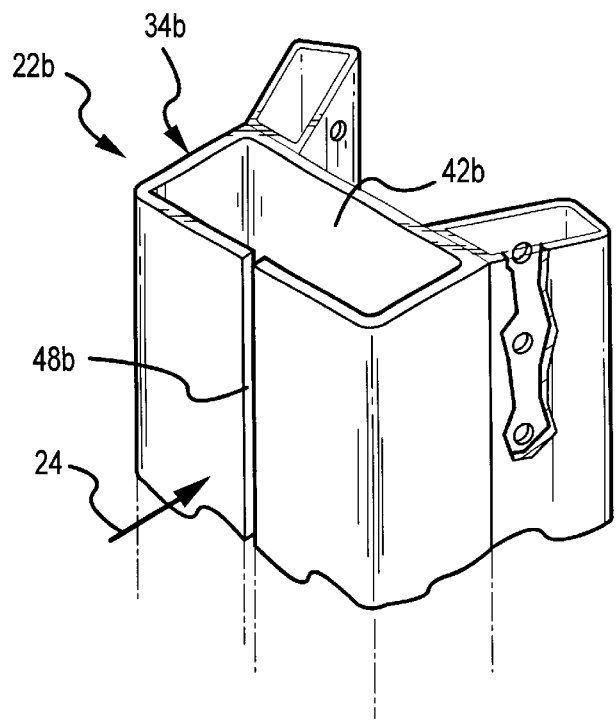
FIG. 7 is a fragmentary perspective view of another embodiment illustrating a substantially "V" shaped cross section for the flat-face bluff body.
Figure 8:
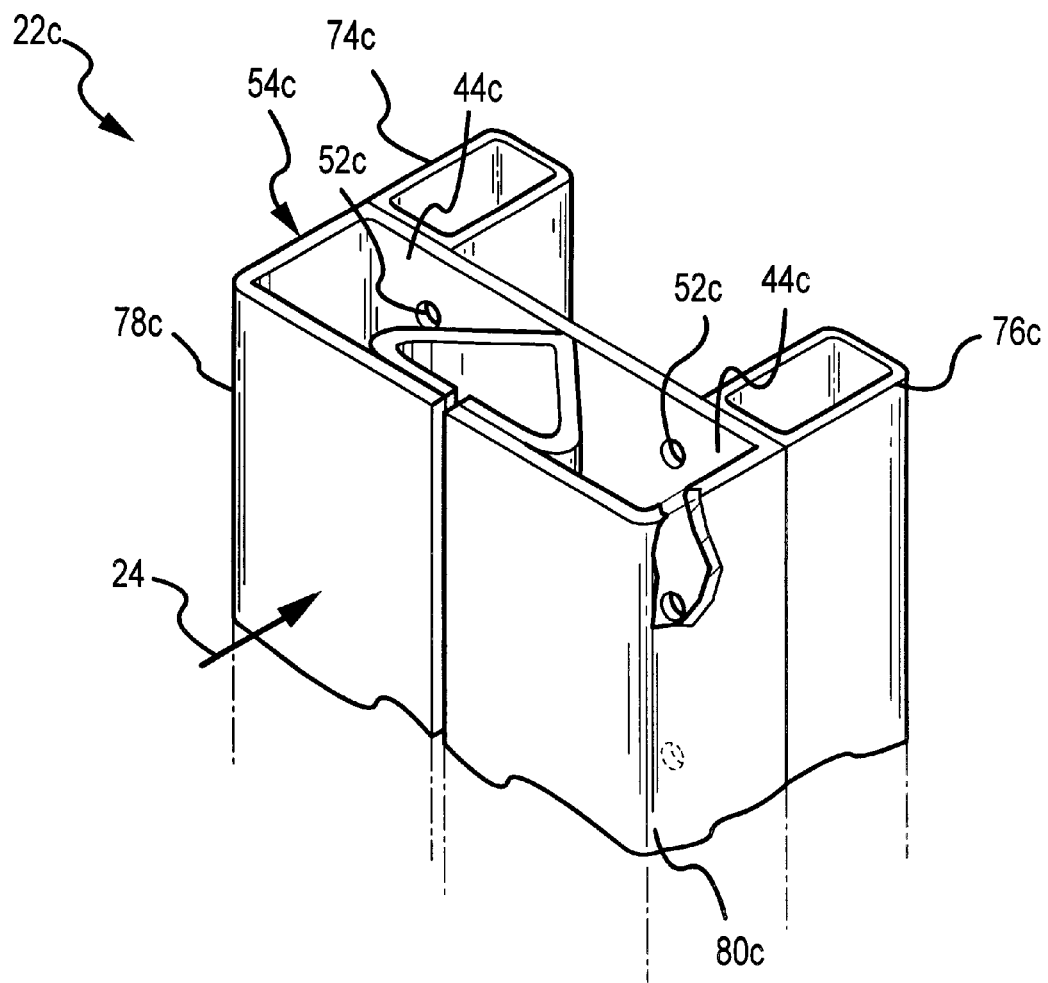
FIG. 8 is a fragmentary perspective view of another embodiment, illustrating a substantially "U" shaped cross section for the flat-face bluff body.
Figure 9C:
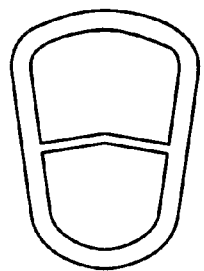
FIGS. 9a–9f are top plan views of bluff body shapes with which the improved impact apertures of embodiments of the invention can be used.
Figure 9F:
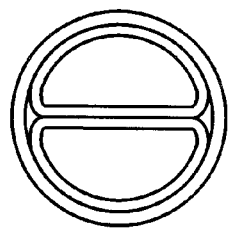
Figure 9B:
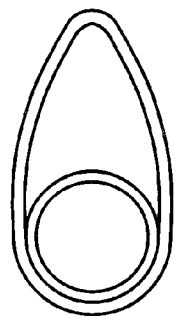
Figure 9E:
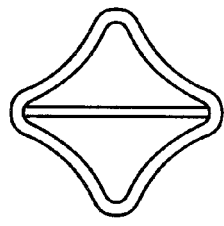
Figure 9A:
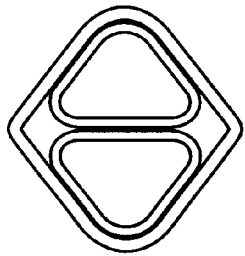
Figure 9D:

Additional embodiments of the invention are shown in FIGS. 6–8. In each, one or more impact slits having a longitudinal component is a common feature. The primary difference between the alternative embodiments and the embodiment described above is the shape of the bluff body. Different designs result in variation of the shape and size of the fluid stagnation zones. Selection of the particular form or design of the bluff body generally depends on several factors incident to the measuring environment, such as, for example, cost, the character of the fluid, the range of fluid flow rates or the size of the conduit carrying the fluid, among others.

FIG. 6 depicts a basic form of a bluff body 22a, having no reattachment extension or projecting rib. A body 70 is provided with a flat impact surface 72 having at least one narrow impact slit 48a that conducts the high pressure fluid into first plenum 42a, through the bluff body, and into the exterior portion of the pitot tube and on into the flow transmitter. Confined spaces 44a in the interior of the body communicate with the non-impact apertures 52a and conduct the low pressure fluid through the body, into the exterior part of the pitot tube, and into the flow transmitter. The provision of impact slit 48a in the face of the bluff body achieves a similar increase in signal-to-noise ratio in the high pressure measurement as found in the "T" shaped embodiment of FIGS. 4 and 5.

FIG. 7 illustrates a "V" shaped form of a bluff body 22b having a flat faced bar portion 34b that faces upstream and is provided with longitudinally extending narrow slit 48b and a first plenum 42b. Another embodiment of a bluff body 22c of the present invention is shown in FIG. 8. The primary difference between this form of the bluff body and that of FIG. 7 is that legs 74c and 76c are positioned perpendicularly to the back side of the bar 54c, forming a structure having a lateral cross section that resembles the letter "U."

FIGS. 9a–9f are top plan views of various bluff body configurations in which impact slits are useful.

Figure 10:
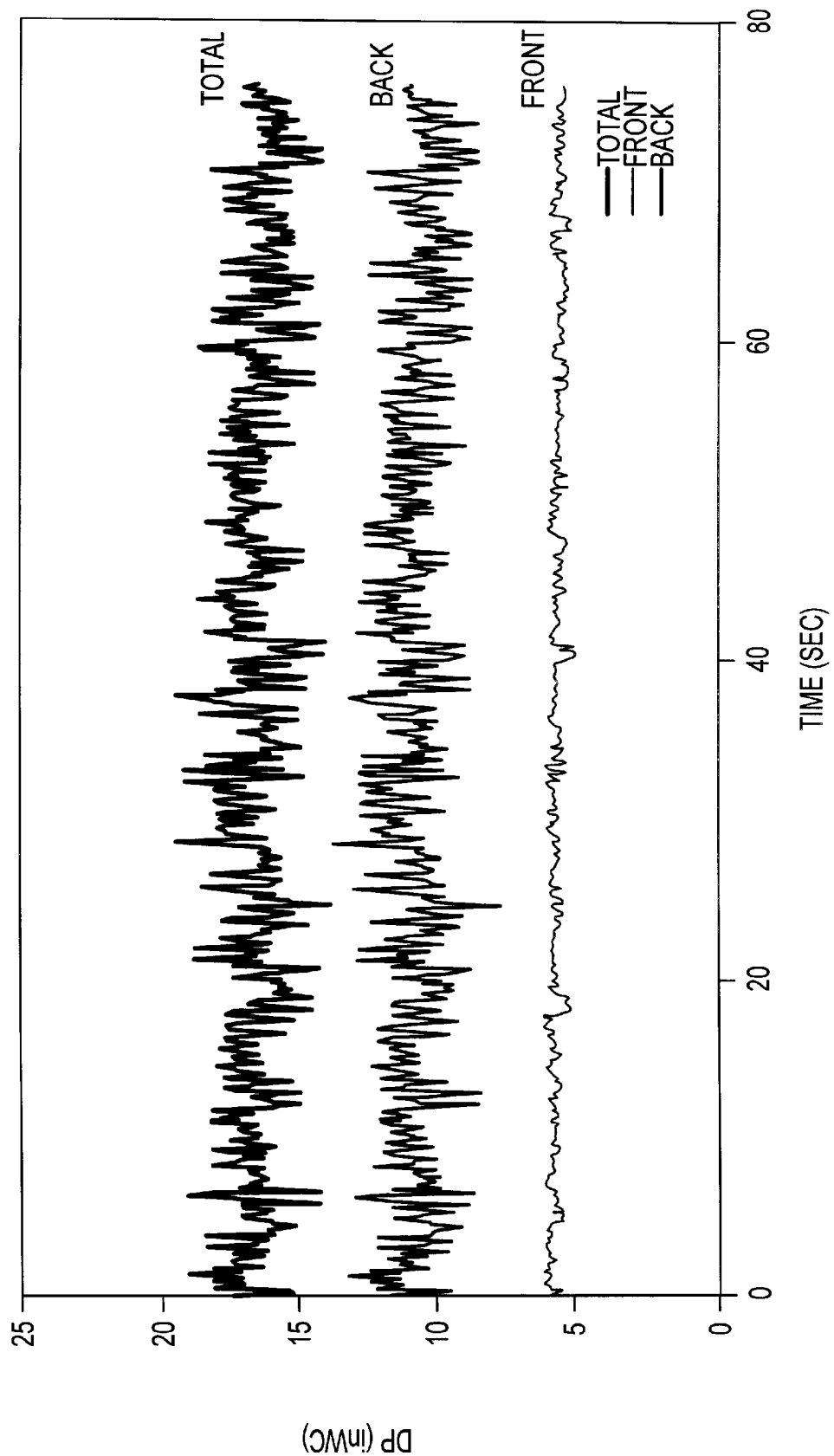
FIGS. 10 and 11 are charts of pressure versus time illustrating the noise reduction of embodiments of the invention.
Figure 11:
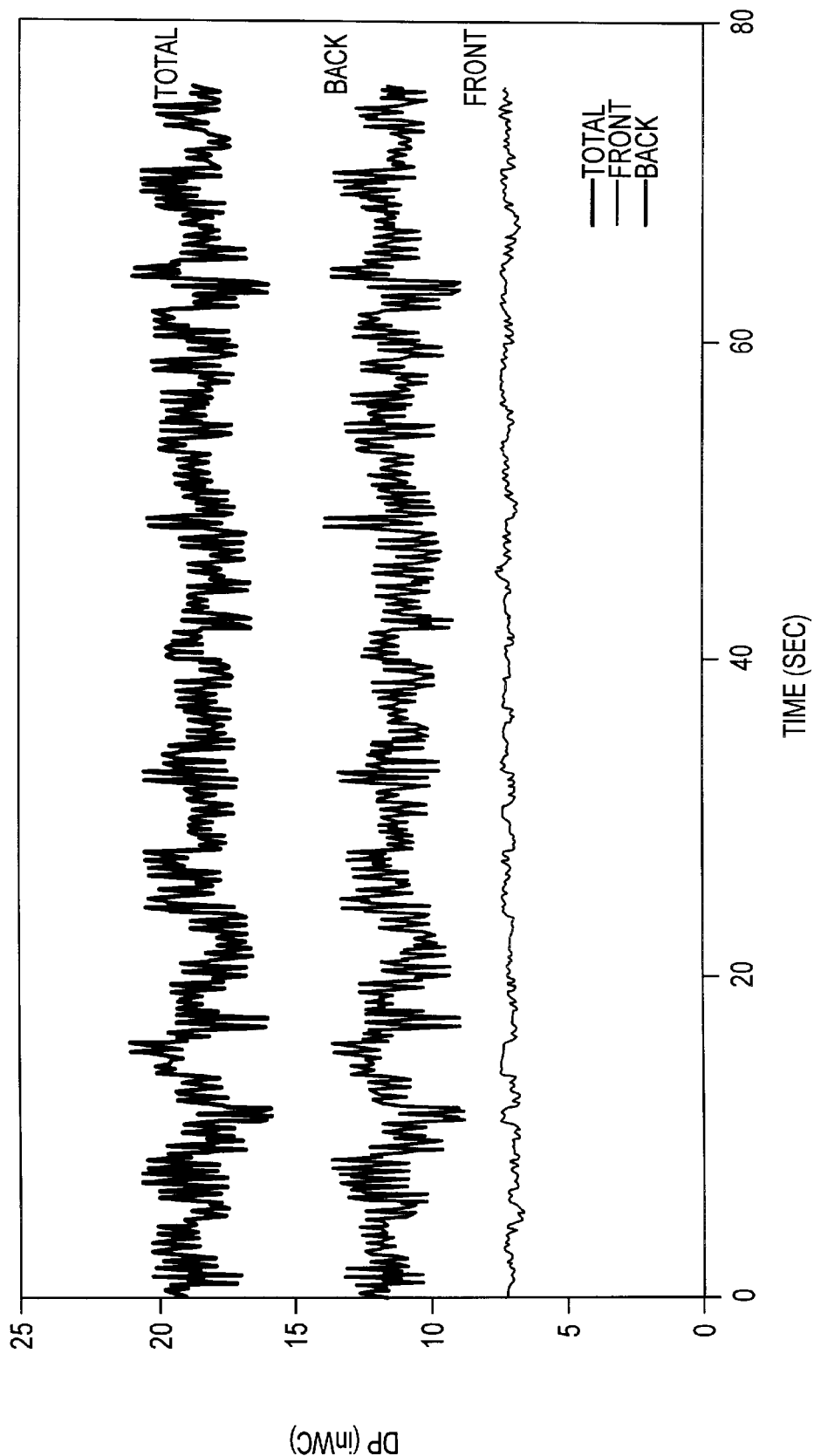

FIGS. 10–11 are charts of pressure versus time illustrating the noise reduction of embodiments of the invention. FIG. 10 illustrates a sample pressure chart of a differential pressure measurement probe in accordance with the prior art. FIG. 11 illustrates a sample pressure chart measured from a probe incorporating an impact slit as shown in FIGS. 2 and 4–8. As shown in FIGS. 10 and 11, appreciable noise reduction in a differential pressure measurement system can be achieved. For example, in FIG. 10, impact noise (represented by 2 times the standard deviation of the impact pressure divided by the average impact pressure) was about 6.50%, while test results shown in FIG. 11 indicate an impact noise of about 4.76%. This impact noise reduction contributes to a total differential pressure noise reduction from 11.79% (for the prior art) to a value of about 10.64% (for embodiments of the invention). Such noise reduction provides for quicker calculation of an accurate indication of differential pressure, thus potentially providing more effective process control.

What is claimed is:

1. A differential pressure sensing probe adapted for partial placement within a conduit having fluid flowing therein from an upstream position to a downstream position, the probe comprising;
   a bluff body comprising at least a first interior cavity and an exterior upstream facing impact surface,
   at least one aperture in the upstream facing impact surface establishing fluid communication between the flowing fluid in the conduit and the first interior cavity, said at least one aperture having a width and a longitudinal component, where the extent of the longitudinal component is greater than the width.

2. The probe of claim 1, wherein the at least one impact aperture includes at least a pair of longitudinal slits.

3. The probe of claim 2, wherein the longitudinal slits are laterally spaced apart.

4. The probe of claim 2, wherein the longitudinal slits are longitudinally spaced apart.

5. The differential pressure sensing probe of claim 1 and further comprising;
   at least a second internal cavity in the bluff body,
   at least one exterior non-impact surface, and
   at least one aperture in the non-impact surface establishing fluid communication between the fluid flowing in the conduit and the second internal cavity.

6. The probe of claim 5, wherein the at least one non-impact surface aperture includes at least one longitudinally extending slit.

7. The probe of claim 1, wherein the at least one impact aperture is positioned to measure an average flow of a laminar flow.

8. The probe of claim 1, wherein the at least one impact aperture is positioned to measure an average flow of a turbulent flow.

9. The probe of claim 2, wherein the length of each impact aperture is based upon the position of the aperture on the impact surface.

10. The probe of claim 1, wherein the at least one impact aperture spans substantially the entire inside diameter of the conduit.

11. A differential pressure measurement system coupleable to a process control loop and adapted to communicate a process variable output related to a differential pressure of a fluid flow within a fluid-carrying conduit, the system comprising:
    a process pressure transmitter including:
       a loop communicator coupleable to the process control loop and adapted for communication upon the process control loop;
       a pressure sensor having first and second pressure ports;
       measurement circuitry coupled to the pressure sensor and configured to provide a sensor output related to differential pressure between the first and second pressure inlets; and
       a controller coupled to the measurement circuitry and the loop communicator, the controller adapted to provide a process variable output to the loop communicator, the process variable output related to the sensor output; and
    a differential pressure measurement probe having a fluid impact surface and adapted for placement within the fluid-carrying conduit, the probe including:
       a first plenum having means to couple to the first pressure sensor port, the first plenum having an internal width and including at least one longitudinal aperture disposed to communicate fluid pressure from the impact surface to the first pressure sensor port, wherein the width of the aperture is less than the internal width of the first plenum; and
       a non-impact surface spaced from the impact surface, the non-impact surface having at least one aperture disposed therein to communicate fluid pressure from the non-impact surface to the second pressure sensor port.

12. A flowmeter for measuring the rate of fluid flowing from an upstream location to a downstream location in a conduit, comprising;

a differential pressure sensing probe having an upstream facing surface and adapted to be disposed diametrically within the conduit, pressure sensor means disposed exteriorly of the conduit, first fluid pressure conducting means interconnecting the sensing probe and the pressure sensor means, said first conducting means including at least one fluid conducting aperture having a width and a longitudinal component where the extent of the longitudinal component is greater than the width.

13. The flowmeter of claim 12 where the at least one fluid conducting aperture is an elongated slit in the upstream facing surface of the sensing probe.

14. The flowmeter of claim 12 where the at least one fluid conducting aperture is a plurality of longitudinally aligned and individually longitudinally dominant slits in the upstream facing surface of the sensing probe.

15. The flowmeter of claim 12 and further including;

second fluid pressure conducting means interconnecting the sensing probe and the pressure sensor means, said second conducting means including at least one fluid conducting aperture.

16. The flowmeter of claim 15 where the first fluid pressure is the total pressure of the fluid flowing in the conduit and the second fluid pressure is the static pressure of fluid flowing in the conduit.

17. The flowmeter of claim 12 where the at least one fluid conducting aperture faces upstream.

18. The method of claim 17, wherein total differential pressure noise is less than 11% of the differential pressure.

19. A method of measuring differential fluid pressure in a conduit carrying fluid from an upstream location to a downstream location comprising, admitting flowing fluid to a fluid conducting plenum through a longitudinally dominant slit in an upstream facing surface of a bluff body inserted into the flowing fluid to gauge the total pressure of the fluid, sensing the static pressure of the fluid carried by the conduit, and comparing the sensed static pressure with the gauged total pressure.

* * * * *